(12) United States Patent
Friesen

(10) Patent No.: US 6,755,272 B2
(45) Date of Patent: Jun. 29, 2004

(54) OVERSIZE WHEEL ASSEMBLY FOR A MOTORCYCLE

(76) Inventor: Henry Friesen, 43 Bruce Avenue, Leamington, Ontario (CA), NH8 4C4

( * ) Notice: Subject to any disclaimer, the term of this patent is extended or adjusted under 35 U.S.C. 154(b) by 0 days.

(21) Appl. No.: 10/235,393

(22) Filed: Sep. 5, 2002

(65) Prior Publication Data

US 2003/0042061 A1 Mar. 6, 2003

Related U.S. Application Data

(60) Provisional application No. 60/317,355, filed on Sep. 5, 2001.

(51) Int. Cl.[7] .............................................. B62M 9/00
(52) U.S. Cl. ...................................................... 180/230
(58) Field of Search ................................ 180/219, 227, 180/230

(56) References Cited

U.S. PATENT DOCUMENTS

| | | | |
|---|---|---|---|
| 2,230,749 A | * | 2/1941 | Herbert ...................... 180/219 |
| 3,756,338 A | * | 9/1973 | Goodridge ................... 180/219 |
| 3,954,145 A | * | 5/1976 | Nesbit ........................ 180/230 |
| 4,299,582 A | | 11/1981 | Leitner |
| 4,494,622 A | * | 1/1985 | Thompson ................... 180/227 |
| 4,585,087 A | * | 4/1986 | Riccitelli .................... 180/230 |
| 4,645,028 A | | 2/1987 | Kawashima |
| 4,735,277 A | * | 4/1988 | Prince ........................ 180/227 |
| 5,996,718 A | | 12/1999 | Desrosiers |
| 6,230,837 B1 | | 5/2001 | Soileau |
| 6,575,260 B2 | * | 6/2003 | Bourget ...................... 180/227 |

* cited by examiner

Primary Examiner—Lesley D. Morris
Assistant Examiner—Paul Royal, Jr.
(74) Attorney, Agent, or Firm—Carlson, Gaskey & Olds

(57) ABSTRACT

A rear tire assembly for mounting an oversize tire to a motorcycle includes an intermediate pulley assembly mounted on a swing arm and driven by a drive of the transmission. The intermediate pulley assembly includes first and second intermediate pulleys rotating in concert about a common shaft. The second pulley is spaced apart from the first intermediate pulley to align with the driven pulley and accommodate the oversized tire.

16 Claims, 5 Drawing Sheets

OVERSIZE WHEEL ASSEMBLY FOR A MOTORCYCLE

RELATED APPLICATIONS

This application claims priority to U.S. Provisional application serial No. 60/317,355 filed on Sep. 5, 2001.

BACKGROUND OF THE INVENTION

This invention is an assembly and for mounting an oversized rear wheel along the centerline of a motorcycle.

Typically, motorcycles are equipped with standard sized front and rear wheels of the same width. Motorcycle owners enjoy spending time on the care and maintenance of their motorcycle and often seek to make their motorcycle unique by adding custom features. A popular custom feature is the installation of an oversized rear wheel. An oversized rear wheel highlights the appearance of power sought by many owners of larger motorcycles. Installation of an oversized tire adds to the aesthetic appearance of the motorcycle, and provides practical benefits. One practical benefit is the improvement in ride obtained by the increased width of the oversized tire. Further, an oversized tire improves the handling, maneuverability, and traction of the motorcycle.

Installation of an oversized tire presents certain design challenges, the main challenge being installation of the oversized wheel within the original frame members. A further challenge is presented in routing power from the transmission to the oversized rear tire. As appreciated, a rear tire with an increased width will no longer align with the drive pulley or sprocket from the drive transmission. Prior art assemblies have attempted to account for this misalignment by moving the rear tire to one side and the engine and transmission to the opposite side to provide additional room required to account for the increased width of the oversized tire. Such modifications purposely mis-align the front and rear wheels in an effort to accommodate the oversized rear tire, thereby creating a less stable ride. Further, movement of the engine and transmission changes the center of gravity of the motorcycle from that of the factory design to further increase the instability of the motorcycle.

Another means of accounting for the larger tire is to provide a sprocket or drive pulley spaced outwardly from the transmission to align with the oversized rear tire. Such a solution can practically accommodate only slightly oversized tires. Further, increasing the distance of the drive pulley from the transmission creates a safety hazard in that the drive belt or chain is positioned at a point closer to a rider's leg.

For these reasons it is desirable to produce an assembly that provides for proper alignment of the front and rear tires, can accommodate any width oversize tire and does not create safety hazards for riders.

SUMMARY OF THE INVENTION

The assembly of this invention is a rear tire assembly for mounting an oversized tire including an intermediate pulley assembly driven by a drive of the transmission including first and second intermediate pulleys rotating in concert about a common shaft. The second pulley is spaced apart from the first intermediate pulley to accommodate extra width of the oversized tire.

The swing arm of this assembly includes extension arms spaced apart to accommodate the oversized tire along with the driven pulley. The swing arm includes a drive plate for mounting the intermediate pulley assembly and an idler pulley. The single drive belt is replaced by short and long drive belts or chain links. The short drive belt transmits torque from the transmission of the motorcycle to the first intermediate pulley. The first and second intermediate pulleys are connected such that rotation of the first intermediate pulley rotates the second intermediate pulley. The second intermediate pulley is spaced apart from the first intermediate pulley to align the long drive belt with the driven pulley on the oversized pulley. The intermediate pulley assembly pivots with the swing arm and the idler pulley maintains tension on the short drive belt during such pivoting.

Accordingly, the assembly of this invention provides proper alignment between front and rear tires, and can accommodate any width oversize tire while providing improved ride and performance.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESRIPTION OF THE PREFERED EMBODIMENT

Figure 1:
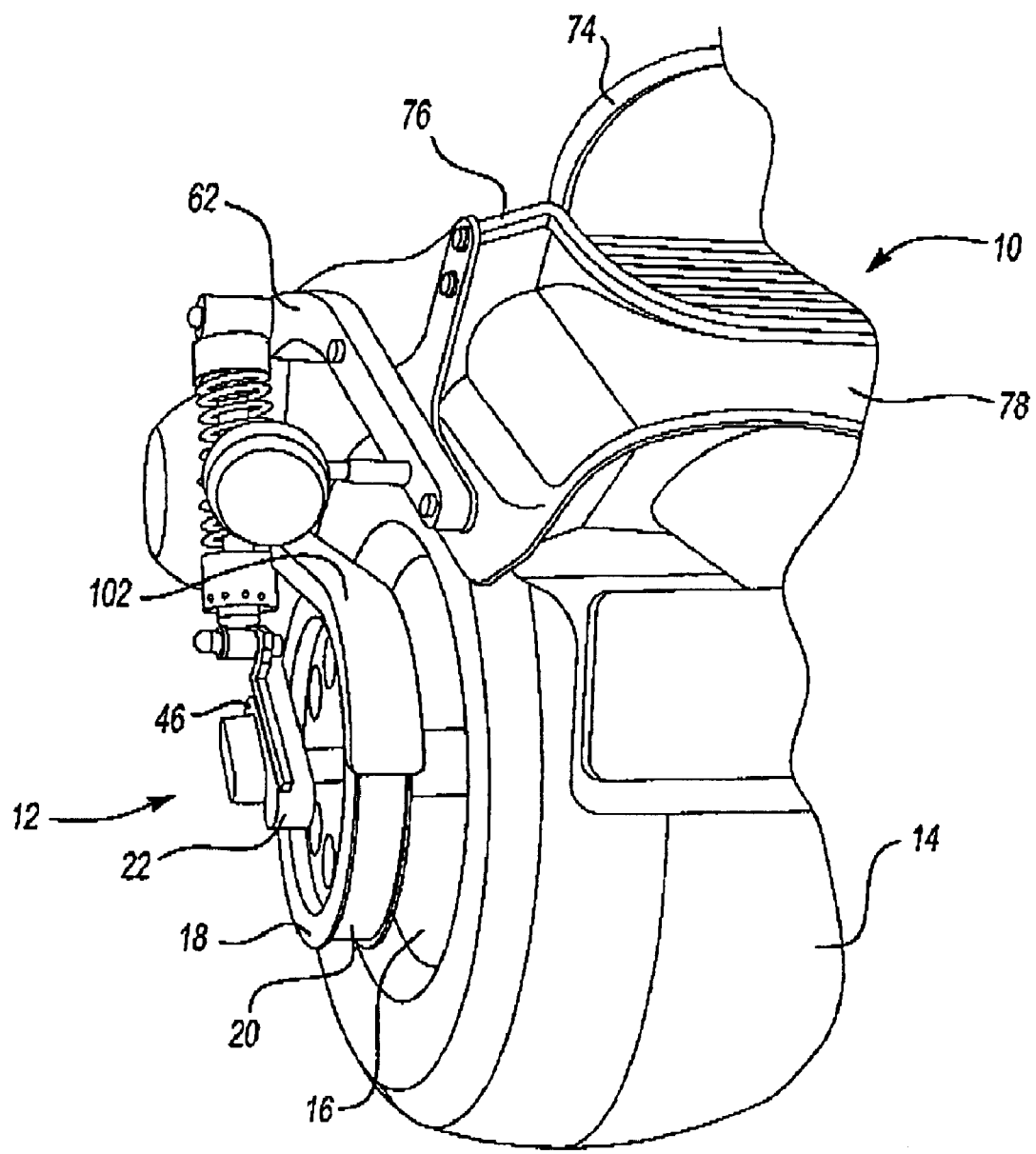
FIG. 1 is a perspective view of a motorcycle with an oversized rear tire.

Referring to FIG. 1, a motorcycle including an oversized tire assembly is generally indicated at 10. The motorcycle shown in FIG. 1 is a Harley Davison with a 230 series tire that is 9¼ inch (230 mm) wide. The tire 14 mounts to a wheel hub 16 including a driven pulley 18 driven by a drive belt 20. Although a pulley and drive belt are shown throughout the Figures, one knowledgeable in the art would understand that a sprocket gear and chain drive would also be within the contemplation of this invention.

Figure 2:
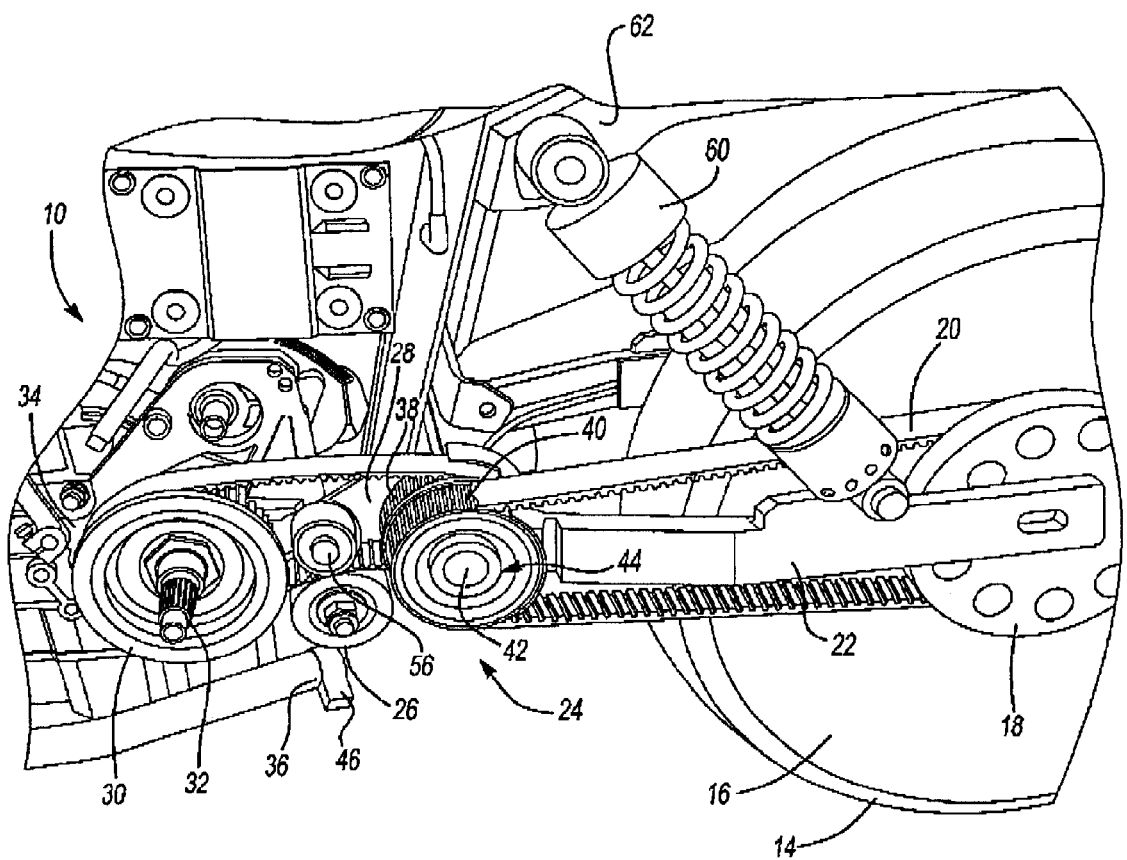
FIG. 2 is a perspective view of a swing arm and intermediate pulleys of this invention.

Referring to FIG. 2, the motorcycle 10 is shown with the oversized tire 14 removed along with the drive belt guards and the transmission cover to expose the component parts of the oversize tire assembly 12. The assembly 12 includes a swing arm 22 pivotally attached to the transmission 34 of the motorcycle 10. In some applications, the swing arm 22 would be attached to the main frame 46 of the motorcycle 10. The swing arm 22 includes an intermediate pulley assembly 24 and an idler pulley 26. The intermediate pulley assembly 24 and the idler pulley 26 mount to a drive plate 28 of the swing arm 22. The drive plate 28 is positioned on the drive side of the motorcycle 10. Preferably, the drive plate 28 is a quarter inch thick and reinforced to accommodate the load exerted by the pivotal connection 56 exposed on the drive plate and connects to the transmission 34. Intermediate shaft 42 is also mounted on the drive plate and is positioned in close proximity to pivotal connection 56. The reason that intermediate shaft is close to the pivotal connection is to maintain near original placement of the rear tire 14 relative to the rest of the motorcycle 10. The pivotal connection 56 includes a bearing housing that houses a bearing assembly to accommodate swing arm 22 movement. Note that the drive side of swing arm 22 requires the use of such a drive place if the original position of the rear wheel is to be maintained. In the illustrated embodiment, the drive side is the left side when viewing the motorcycle 10 from the rear. As appreciated, the drive plate 28 may be located on either side of the motorcycle 10 depending on the configuration of a specific motorcycle.

A drive pulley 30, fixed for rotation on drive shaft 32 of the transmission 34, drives the intermediate pulley assembly 24 through a drive belt 36. Preferably, the drive belt 36 is a toothed belt that engages corresponding teeth disposed on the drive pulley 30 and the intermediate pulley assembly 24. The intermediate pulley assembly 24 includes first and second pulleys 38,40. The first pulley 38 is aligned with the drive pulley 30. The second pulley 40 is fixed to the first pulley 38 such that both first and second pulleys 38,40 rotate at the same speed. The second pulley 40 is spaced a distance from the first pulley 38. The distance between the intermediate pulleys 38,40 is such that the second pulley 40 aligns with the driven pulley 18 mounted on the wheel hub 16 of the oversize tire 14 (Best shown in FIG. 1).

The intermediate pulley assembly 24 includes a fixed shaft 42 attached to the drive plate 28. Each of the first and second pulleys 38,40 are supported for rotation about the fixed shaft 42 by at least one bearing assembly 44. The bearing assemblies 44 may be of any kind known to those skilled in the art. The use of the fixed shaft 42 provides a robust and durable assembly capable of withstanding the high loads encountered during operation of the motorcycle 10.

The first and second pulleys 38,40 of the intermediate pulley assembly 24 are of a uniform diameter, such that the ratio between the drive pulley 30 and the driven pulley 18 is not changed by the intermediate pulley assembly 24. However, it is within the contemplation of this invention that the first and second pulleys 38,40 of the intermediate pulley assembly 24 may be of different diameters to modify the ratio between the driven pulley 30 and the drive pulley 18. Changing of the ratio between the first and second pulleys 38,40 provides an easy means of adjusting the final drive ratio to tune performance of the motorcycle 10.

In this invention, two drive belts 36,20 are substituted for the single original drive belt. The first short drive belt 36 extends from the drive pulley 18 to the first pulley 38 of the intermediate pulley assembly 24. The idler pulley 26 mounted on the drive plate 28 adjusts to maintain a desired tension on the first short drive belt 36. The idler pulley 26 accommodates for pivotal movement of the swing arm 22 relative to the main frame 46. A second long drive belt 20 extends from the second intermediate pulley 40 to drive the driven pulley 18.

The configuration of the intermediate pulley assembly 24 provides for easy adaptation to accommodate oversize tires of any size. The distance between the first and second intermediate pulleys 38,40 may be adjusted to accommodate any width of oversized tire without changing placement of the transmission, and while maintaining the common centerline of the front and rear tires.

Figure 3:
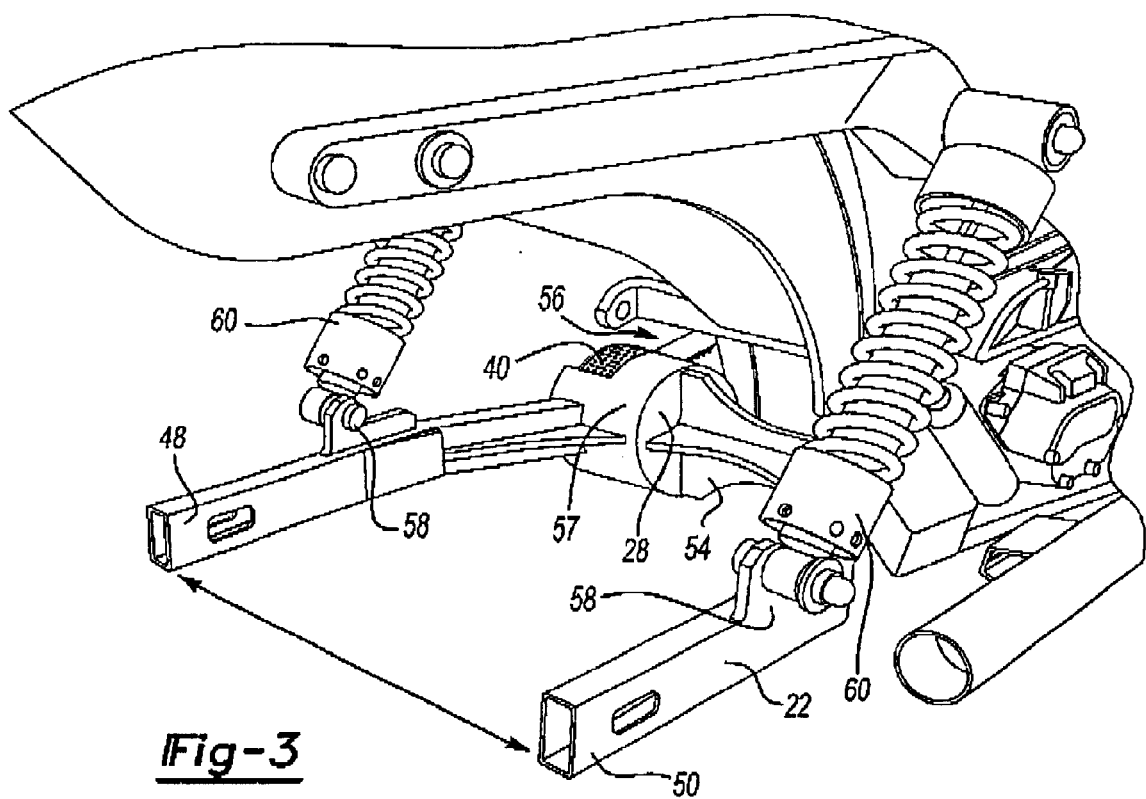
FIG. 3 is a perspective view of the swing arm mounted to the motorcycle frame.

Referring to FIG. 3, the swing arm 22 is a generally u-shaped member having first and second fork extensions 48,50 that support an axle 52 of the wheel hub 16.

Preferably, first and second extensions 48,50 extend from a base portion 54 of the swing arm 22. The base portion 54 includes the pivotal connection 56 to the main frame 46 such that the entire swing arm 22 rotates about the pivotal connection 56. The base portion 54 of the swing arm 22 includes the drive plate 28 on the drive side of the motorcycle 10 along with integrally formed guards 57 that conform to the outer diameter of the intermediate pulleys 38,40.

The distance between the first and second extensions 48,50 is determined by the specific width of tire to be installed onto the motorcycle 10. As appreciated, by adjusting the distance between first and second extensions 48,50, and the corresponding distance between first and second intermediate pulleys 38,40 an oversized tire 14 of any size can be installed onto the motorcycle 10. The swing arm 22 also includes mounting brackets 58 for mounting of shock absorbers 60. A worker skilled in the art would understand that the mounting brackets 58 can be configured to accommodate any type of suspension.

Figure 4:
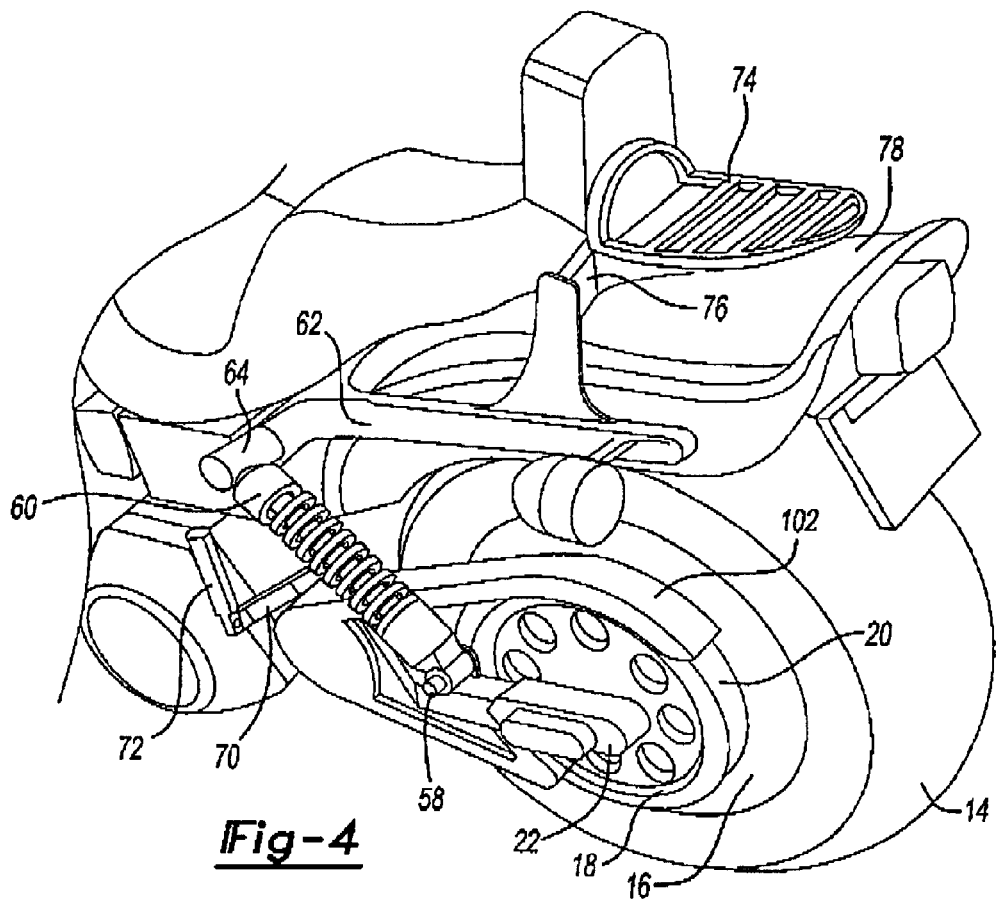
FIG. 4, is a perspective view of the invention installed onto a motor cycle.
Figure 5:
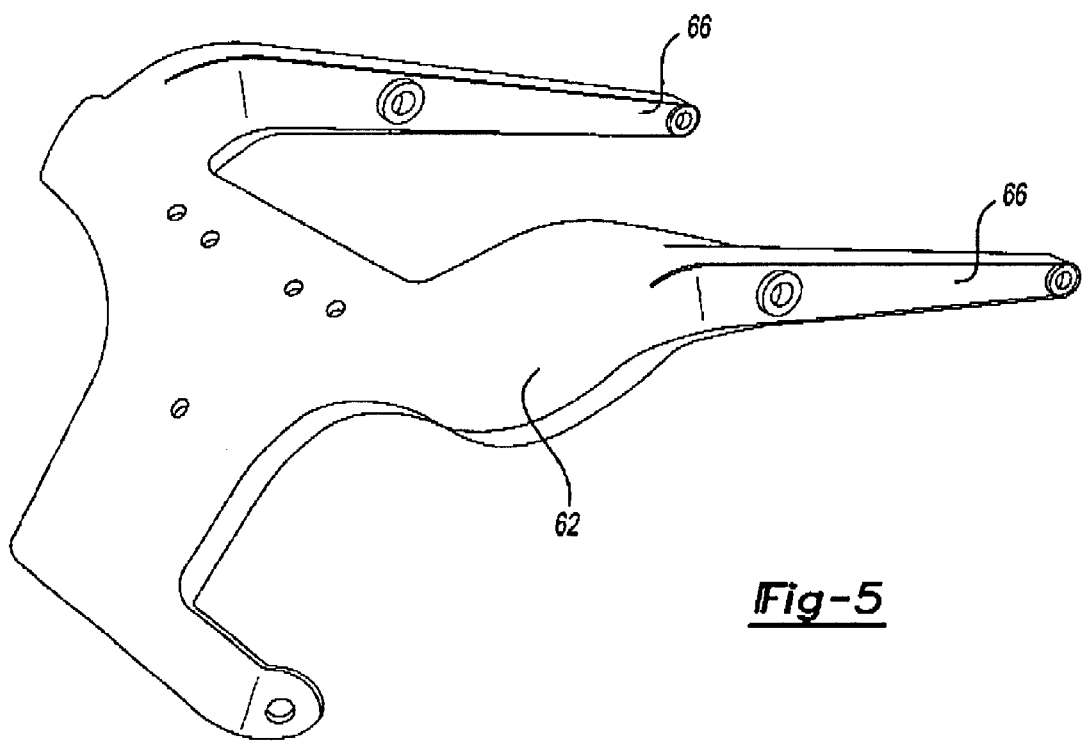
FIG. 5, is a perspective view a suspension bracket.

Referring to FIGS. 4 and 5, installation of the swing arm 22 to accommodate the oversized tire 14 necessitates the modification of the suspension bracket 62 such that the top mount 64 of the shock absorbers 60 must be moved out a distance corresponding to the width of the swing arm 22. The suspension bracket 62 also includes two mounting extensions 66 to which the rear fender 68 is attached. A support extension 70 from the suspension bracket accommodates a foot support peg 72.

Referring back to FIG. 1, a passenger seat upright 74 is provided and the difference in width from the original is accommodated by the addition of spacers 76. The rear fender 78 was also modified from the original width to correspond to the increased width of the suspension bracket 62 and the oversized tire 14.

The components of the oversized tire assembly 12 have been described and illustrated for a specifically configured motorcycle. The specific components of this assembly may be modified to accommodate differing sizes of oversize tires or to accommodate different configuration of motorcycles.

Figure 6:
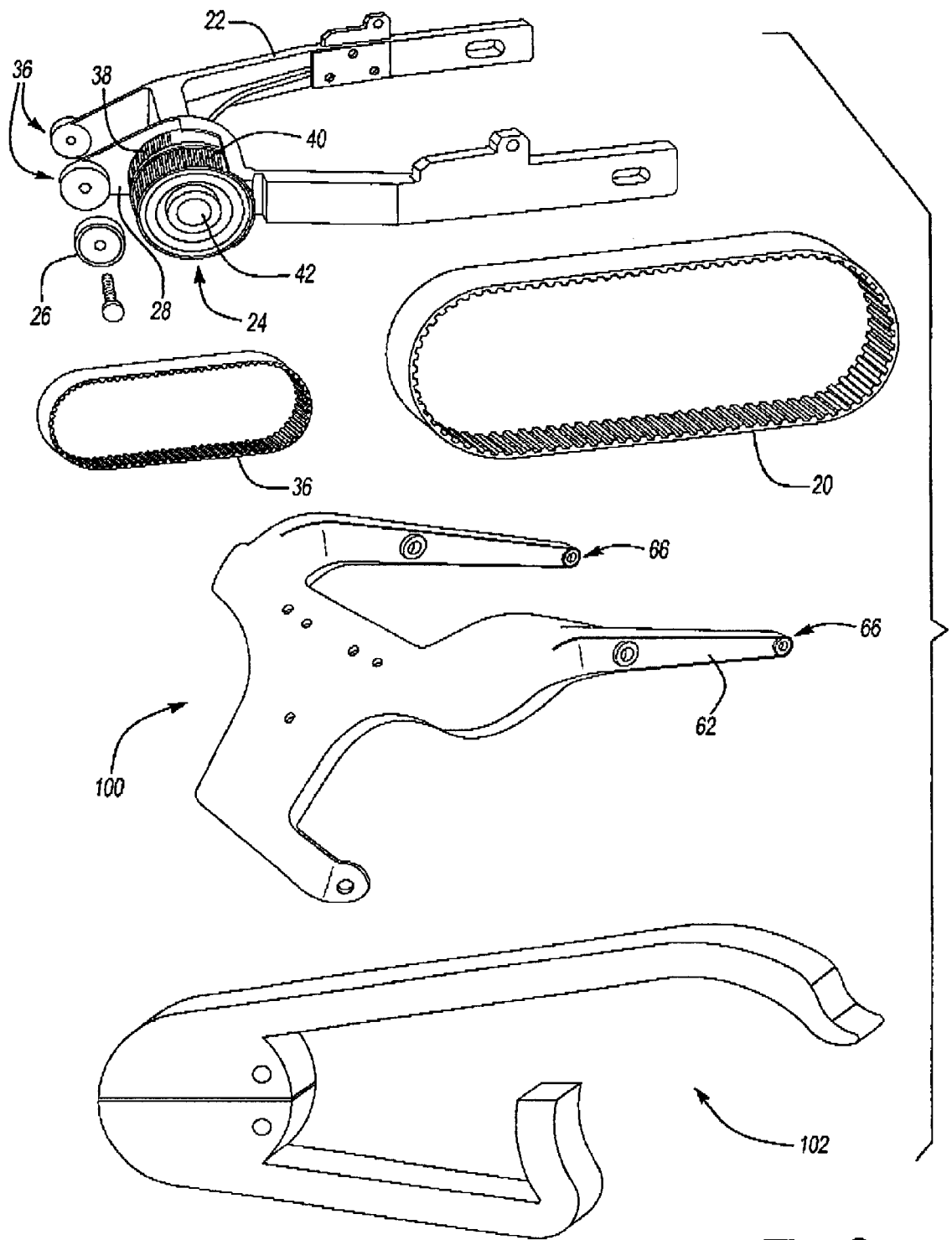
FIG. 6 is a perspective view of the components of in kit form.

Referring to FIG. 6, it is contemplated that the components of the oversized tire assembly 12 would be included in a kit generally indicated at 100 designed to fit specific configuration of motorcycles and specific tire widths. The kit 100 includes the swing arm 22 including hardware 80 corresponding to pivotal connections 36. The swing arm 22 includes the intermediate pulley assembly 24 having the first and second intermediate pulleys 38, 40.

Preferably, the intermediate pulley assembly 24 is pre mounted to the swing arm 22. Along with the swing arm 22 short and long drive belts 36 and 20 are provided. The specific lengths of the drive belts 36 and 20 are sized according the specific application. Further, the suspension bracket 62 corresponding to the swing arm 22 is also provided to complete mounting to the motorcycle. In addition to the swing arm 22 and the suspension bracket 62, a guard assembly 102 may also be included. The guard assembly 102 is also configured according to the specific application. Some of the factors determined the specific configuration of the kit 100, include the drive means, either pulley or sprocket, chain or belt drive, as well as the width of the tire to be installed onto the motorcycle.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A rear tire assembly for a motorcycle comprising;
   a swing arm pivotally attached to a main frame of the motorcycle, said swing arm including extension arms including a distance therebetween for accommodating a tire mounted to a wheel hub including a driven member;
   an intermediate drive assembly disposed on said swing arm including a first intermediate rotating member aligned with a drive and a second intermediate rotating member spaced apart from said first intermediate rotating member and aligned with said driven member on said wheel hub; and
   an idler mounted on said swing arm between said drive and said first intermediate rotating member.

2. The assembly of claim 1, including a first drive link transmitting torque between said drive and said first intermediate rotating member, and a second drive link transmitting torque between said second intermediate rotating member and said driven member.

3. The assembly of claim 2, wherein said drive; first and second intermediate rotating members and said driven members are pulleys, and said driven links are belts.

4. The assembly of claim 3, wherein said belts are toothed and said pulleys include grooves corresponding to said toothed belt.

5. The assembly of claim 2, wherein said drive, first and second intermediate rotating members and said driven members are sprockets, and said driven links are chains.

6. The assembly of claim 1, wherein said first and second intermediate rotating members are fixed to one another about a common shaft such that both of said first and second intermediate rotating member rotate concurrently.

7. The assembly of claim 6, wherein said common shaft is fixed, and said first and second rotating members rotate about said common shaft.

8. The assembly of claim 1, including a suspension bracket including extensions separated a distance corresponding with said extension arms of said swing arm and at least one suspension member mounted between extension arms and said extensions of said suspension bracket.

9. The assembly of claim 8, including a fender mounted to said suspension bracket.

10. The assembly or claim 1, wherein said first and second intermediate rotating members rotate about a common axis.

11. The assembly of claim 1, wherein said first and second intermediate rotating members are of a common diameter.

12. The assembly of claim 1, wherein said first and second intermediate rotating members are of different diameters.

13. The assembly of claim 1, wherein said idler maintains tension on a driven link between said drive and said first intermediate rotating member.

14. A kit for installing an oversize tire onto a motorcycle comprising;
   a swing arm for pivotal attachment to a main frame of the motorcycle, said swing arm including extension arms separated a distance for accommodating a tire mounted to a wheel hub including a driven pulley;
   an intermediate drive assembly mounted on said swing arm including a first intermediate pulley aligned with a drive pulley of the motorcycle and a second intermediate pulley spaced axially apart from said first intermediate pulley and aligned with said driven pulley on said wheel hub;
   a first belt for transmitting torque between said drive pulley and said first intermediate pulley, and a second belt for transmitting torque between said second intermediate pulley and said driven pulley; and
   and an idler pulley mounted to said swing arm for maintaining tension of said first belt.

15. The kit of claim 14, including a suspension bracket for mounting to said frame of said motorcycle and having extensions corresponding to said extension arms of said swing arm for mounting at least one suspension member.

16. The kit of claim 14, including first and second intermediate pulleys of a common diameter rotating about a common shaft.

* * * * *